United States Patent
Chatterjee (10) Patent No.: US 12,190,249 B2
(45) Date of Patent: Jan. 7, 2025

(54) SIMULATING SERVICE PERFORMANCE USING MACHINE LEARNING

(71) Applicant: Intuit Inc., Mountain View, CA (US)

(72) Inventor: Shreeshankar Chatterjee, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 895 days.

(21) Appl. No.: 17/334,620

(22) Filed: May 28, 2021

(65) Prior Publication Data
US 2022/0383129 A1   Dec. 1, 2022

(51) Int. Cl.
| | |
|---|---|
| *G06N 3/088* | (2023.01) |
| *G06F 8/77* | (2018.01) |
| *G06F 11/34* | (2006.01) |
| *G06F 11/36* | (2006.01) |
| *G06N 3/045* | (2023.01) |

(52) U.S. Cl.
CPC ............. *G06N 3/088* (2013.01); *G06F 8/77* (2013.01); *G06F 11/34* (2013.01); *G06F 11/36* (2013.01); *G06N 3/045* (2023.01)

(58) Field of Classification Search
CPC .......... G06N 3/088; G06N 3/045; G06F 8/77; G06F 11/34; G06F 11/36
See application file for complete search history.

(56) References Cited

U.S. PATENT DOCUMENTS

| | | | | |
|---|---|---|---|---|
| 8,625,757 | B1* | 1/2014 | Karpov | H04M 15/47 379/112.06 |
| 11,295,224 | B1* | 4/2022 | Huang | G06F 9/5083 |
| 2018/0227211 | A1* | 8/2018 | Vijayanathan | G06Q 50/01 |
| 2019/0372897 | A1* | 12/2019 | Fuerter | H04L 43/08 |
| 2020/0250540 | A1* | 8/2020 | Mehr | G06T 17/20 |
| 2020/0382402 | A1* | 12/2020 | Kolar | H04L 43/20 |
| 2021/0014126 | A1* | 1/2021 | Ganapathi | G05B 17/02 |
| 2022/0100171 | A1* | 3/2022 | Miller | G06N 20/00 |
| 2022/0308977 | A1* | 9/2022 | Slinger | G06F 11/3428 |

OTHER PUBLICATIONS

Malhotra, P., et al, "LSTM-Based Encoder-Decorder for Multi-Sensor Anomaly Detection", Jul. 11, 2016, 5 pages.
Remy, P, "Anomaly Detection in Time Series using Auto Encoders", http://philipperemy.github.io/anomaly-detection/, Oct. 2, 2016, 10 pages.
Zhang, A., "Anomaly Detection with Z-Score: Pick the Low Hanging Fruits", https://medium.com/swlh/anomaly-detection-with-z-score-pick-the-low-hanging-fruits-ccd5ccccaee9, Nov. 28, 2019, 13 pages.

* cited by examiner

*Primary Examiner* — Wei Y Zhen
*Assistant Examiner* — Amir Soltanzadeh
(74) *Attorney, Agent, or Firm* — Lathrop GPM LLP (57) ABSTRACT

A method may include obtaining, for each period within a time interval, raw performance metric values for a performance metric of a service, encoding the raw performance metric values to generate inferred performance metric values for the performance metric, and selecting a portion of the inferred performance metric values. The portion corresponds to a representative period. The may method further include obtaining a service request for the service, generating a simulated response to the service request, and transmitting the simulated response using the portion of the inferred performance metric values.

18 Claims, 9 Drawing Sheets

SIMULATING SERVICE PERFORMANCE USING MACHINE LEARNING

BACKGROUND

Simulating the performance of services may be useful in accelerating the software development life cycle (SDLC) of a target program. The performance of a service may be measured using various time series metrics, such as latency, throughput, error rate, etc. One approach to simulation is recording traffic generated during the operation of a service in log files. The log files are used to replay the recorded performance. Another approach is utilizing a general simulator that aggregates empirical performance data gathered from the operation of multiple services.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, for each period within a time interval, raw performance metric values for a performance metric of a service, encoding the raw performance metric values to generate inferred performance metric values for the performance metric, and selecting a portion of the inferred performance metric values. The portion corresponds to a representative period. The method further includes obtaining a service request for the service, generating a simulated response to the service request, and transmitting the simulated response using the portion of the inferred performance metric values.

In general, in one aspect, one or more embodiments relate to a system including an autoencoder configured to obtain, for each period within a time interval, raw performance metric values for a performance metric of a service, encode the raw performance metric values to generate inferred performance metric values for the performance metric, and select a portion of the inferred performance metric values. The portion corresponds to a representative period. The system further includes a container configured to obtain a service request for the service, generate a simulated response to the service request, and transmit the simulated response using the portion of the inferred performance metric values.

In general, in one aspect, one or more embodiments relate to a method including sending a simulation launch request including first service metadata to a container, and sending a service request for the service to the container. The container is configured to perform determining that the first service metadata matches second service metadata corresponding to an autoencoder, receiving, from the autoencoder, inferred performance metric values for the performance metric for a representative period, generating a simulated response to the service request, and transmitting the simulated response using a portion of the inferred performance metric values. The portion corresponds to the representative period. The autoencoder is configured to perform obtaining, for each period within a time interval, raw performance metric values for a performance metric of a service, encoding the raw performance metric values to generate the inferred performance metric values for the performance metric, and selecting the portion of the inferred performance metric values. The method further includes receiving, from the container, the simulated response.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a simulation architecture for computer system prediction of service performance during execution of a target program. The simulation architecture includes an imitated production environment for the target program and a container. The container simulates the execution performance of services used by the target program. The combination of the imitated production environment and container may be used to test the target program early in the software development life cycle (SDLC) without incurring the overhead of creating a full target production environment that includes actual endpoints for the various services used by the target program.

To simulate the execution performance, performance metrics are generated by each service. The performance metrics describe the operation of the service. Examples of performance metrics include latency, throughput, error rate, resource utilization, etc. Performance metrics may be represented as a time series of values each corresponding to a different period (e.g., part of a day, a day, week, month, etc.).

By way of a more detailed overview, raw values for a performance metric of a service are obtained for periods included in a time interval (e.g., the most recent two weeks). The raw performance metric values are encoded to generate inferred performance metric values. The inferred performance metric values represent dominant trends in the values of the performance metric. For example, the inferred performance metric values may represent a dominant trend in the values of the performance metric for a most recent time interval. Alternatively, the inferred performance metric values may represent a dominant trend in the values of the performance metric for a specific time interval (e.g., an interval corresponding to a product launch, or a major service outage, etc.). By representing the dominant trend, the inferred performance metric values may more accurately approximate performance during production than the raw performance metric values.

The inferred performance metric values may be generated by an encoder, such as a long short-term model (LSTM) autoencoder that reconstructs the input sequence of the autoencoder. The autoencoder may be trained using raw performance metric values for a baseline period. The autoencoder uses training losses to determine whether each of the raw performance metric values represents an anomaly (e.g., outlier). By identifying anomalies, the autoencoder is able to reduce or eliminate noise in the inferred performance metric values for the performance metric.

The container receives inferred performance metric values for the performance metric for a representative period. The container further receives service requests from the target program and transmits simulated responses to the target program in response to the received service requests, according to the inferred performance metric values for the performance metric. The service requests may be sent by the target program to test the behavior of the target program using the simulated performance of the service by the container.

The autoencoder may be further trained using raw performance metric values for a next baseline period, as the performance prediction process is repeated for a pipeline of successive time intervals, where the autoencoder may set the next baseline period to the previous representative period.

Figure 1A:
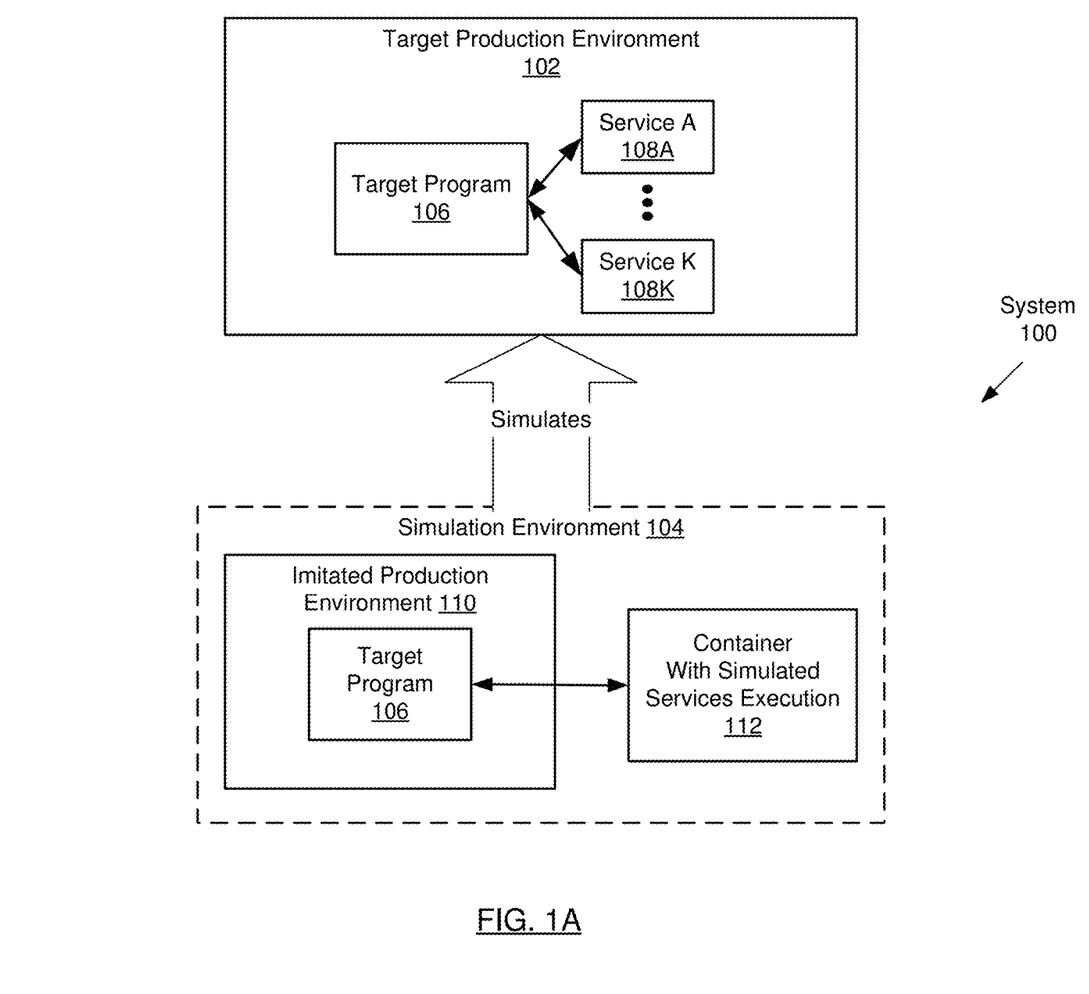
FIG. 1A, FIG. 1B, FIG. 1C, and FIG. 1D show a system in accordance with one or more embodiments of the invention.

FIG. 1A shows a diagram of a system (100) in accordance with one or more embodiments. As shown in FIG. 1A, the system (100) includes multiple components such as a target production environment (102) and a simulation environment (104). Each of these components is described below.

Figure 5A:
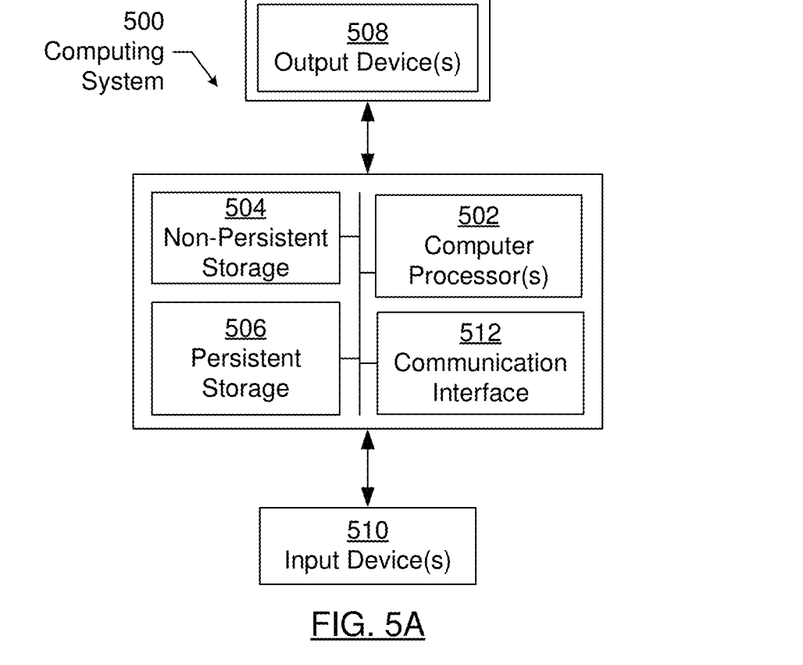
FIG. 5A and FIG. 5B show computing systems in accordance with one or more embodiments of the invention.
Figure 5B:
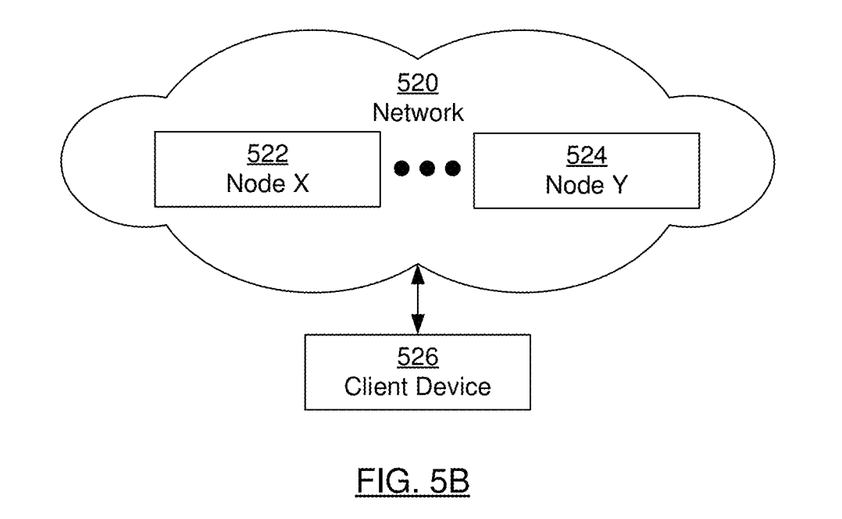

The target production environment (102) is a computing platform that executes the target program for end-users. Specifically, the target production environment (102) is the computing environment in which the target program is intended to execute. The target production environment (102) may be referred to as a deployment environment. The target production environment (102) includes software and virtual and/or physical hardware. Specifically, the target production environment (102) includes services (108A, 108K), virtual machines, operating systems, etc. used by a target program (106). The services (108A, 108K) and the target program (106) are computer programs written in any programming language that includes executable instructions stored in some sort of memory. The instructions, when executed by one or more processors, enable a device that is included in the target production environment (102) to perform the functions described in accordance with one or more embodiments. The device may take the form of the computing system (500) shown in FIG. 5A connected to a network (520) as shown in FIG. 5B.

A service (108A) includes functionality to generate responses to service requests received from the target program (106)). Examples of services include database services, search services, identity validation and/or authentication services, analytics services, etc. The service (108A) may include an application program interface (API) that includes functionality to receive service requests and generate responses to the service requests.

The simulation environment (104) is a computing platform that simulates or otherwise mimics the target production environment (102). The simulation environment (104) includes functionality to test the target program (106). The simulation environment (104) includes an imitated production environment (110) and a container with simulated services execution (112).

The imitated production environment is a portion of the simulations environment (104) that mimics the functionality of the target production environment (102) with respect to the target program (106). The imitated production environment (110) may take the form of the computing system (500) shown in FIG. 5A connected to a network (520) as shown in FIG. 5B. For example, the imitated production environment (110) may be a computing platform that replaces one or more of the services (108A, 108K) used by the target program (106) with stubs.

The imitated production environment (110) may be used to test the target program (106) by interfacing with a container (112) with simulated services execution. That is, the container (112) includes functionality to simulate the performance of one or more services (108A, 108K) used by the target program (106). For example, the imitated production environment (110) may be used to test the target program (106) early in the software development life cycle (SDLC) of the target program (106). Continuing this example, the imitated production environment (110) may be used to test the target program (106) without incurring the overhead of creating the full target production environment (102) that includes actual endpoints for the various services (108A, 108K) used by the target program (106). The container (112) includes functionality to simulate the performance of one or more services (108A, 108K). For example, the container (112) may generate simulated (e.g., mock) responses to service requests issued by the target program (106).

In FIG. 1A, the simulation environment (104) is represented using dashed lines to show that the simulation environment is a combination of two distinct and separate components, which individually, rather than jointly, simulate the target production environment (102).

Figure 1B:
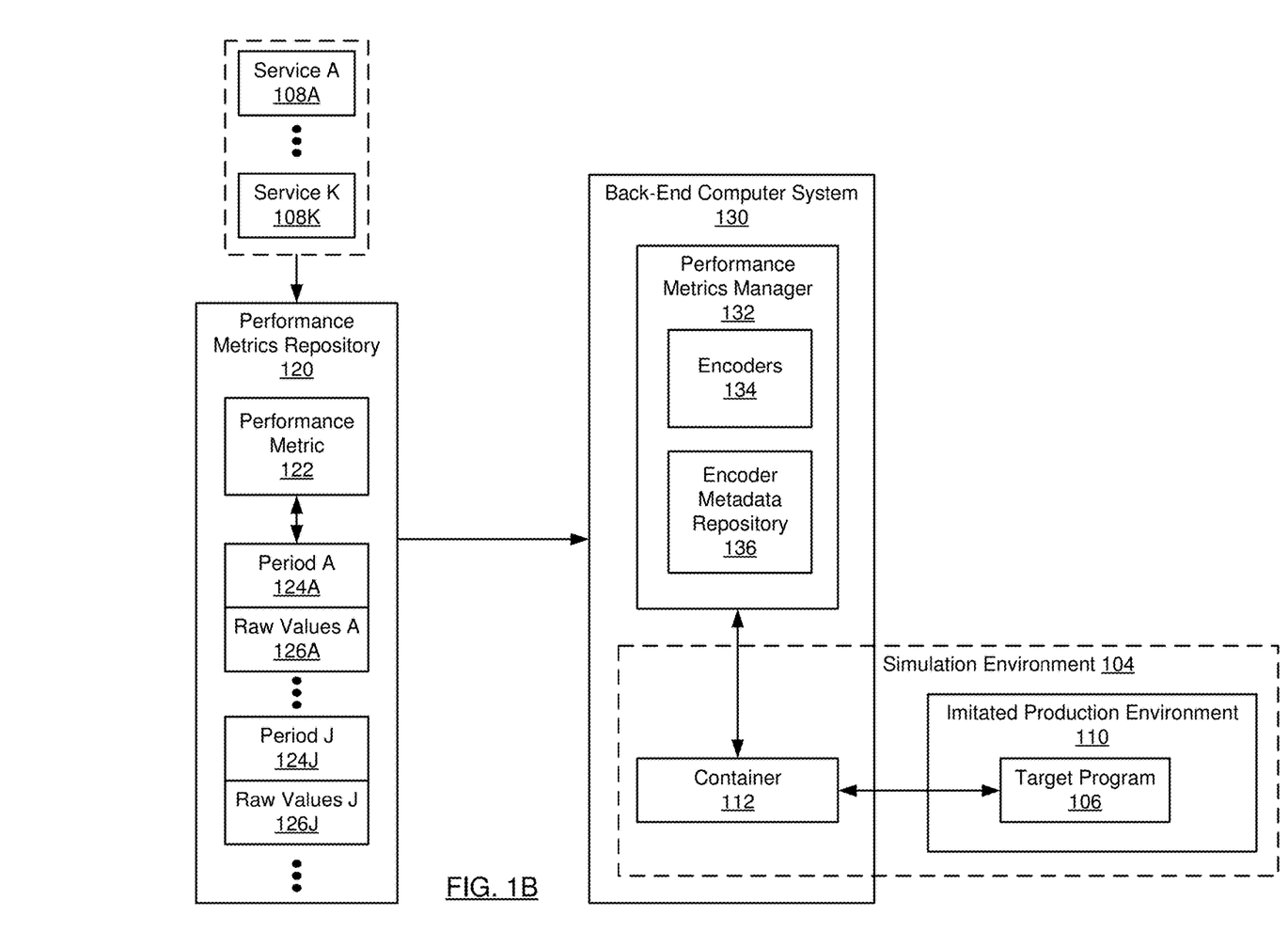

Turning to FIG. 1B, a performance metric repository (120) includes functionality to store one or more performance metrics (122) for the services (108A, 108K). The performance metric repository (120) is any type of storage unit and/or device (e.g., a file system, database, collection of tables, or any other storage mechanism) for storing data. Further, the performance metric repository (120) may include multiple different storage units and/or devices. The multiple different storage units and/or devices may or may not be of the same type or located at the same physical site. The performance metric repository (120) may be accessed online via a cloud service (e.g., Oracle Cloud, Amazon Web Services (AWS), Egnyte, Azure, etc.).

Performance metrics are measurements that describe the operation of a service (108A). Namely, the performance metrics define how well the service executes rather than the particular inputs and outputs of the service. The performance metrics may be gathered from each service (108A). For example, the performance metrics may be gathered by monitoring the respective service via different mechanisms that are internal and/or external to the instructions of service. Examples of performance metrics include latency (e.g., duration between receiving a request and sending a response to the request), throughput, error rate, resource (e.g., central processing unit (CPU) or system memory) utilization, etc. Performance metrics may be represented as a time series of raw performance metric values (126A, 126J) each corresponding to a different period (124A, 124J). A period (124A) is a portion of a time interval. For example, the period may be 1 day and the time interval may be 2 weeks.

FIG. 1B shows that the container (112) of the simulation environment (104) of FIG. 1A may be deployed in a back-end computer system (130). The back-end computer system (130) may take the form of the computing system (500) shown in FIG. 5A connected to a network (520) as shown in FIG. 5B. The back-end computer system (130) includes a performance metrics manager (132). The performance metrics manager (132) includes encoders (134) and an encoder metadata repository (136).

In one or more embodiments, the encoders (134) are implemented using long short-term model (LSTM) autoencoders. The expression "long short-term" refers to a model whose short-term memory may persist for a long period of time. An LSTM is well-suited to classify, process and/or predict values in a time series given time lags of unknown size and/or durations between events. An LSTM autoencoder may be a deep learning neural network whose building blocks are LSTM units. An LSTM autoencoder includes functionality to learn values of latent variables of an input data sequence by encoding (e.g., compressing) the input data sequence.

Figure 1C:
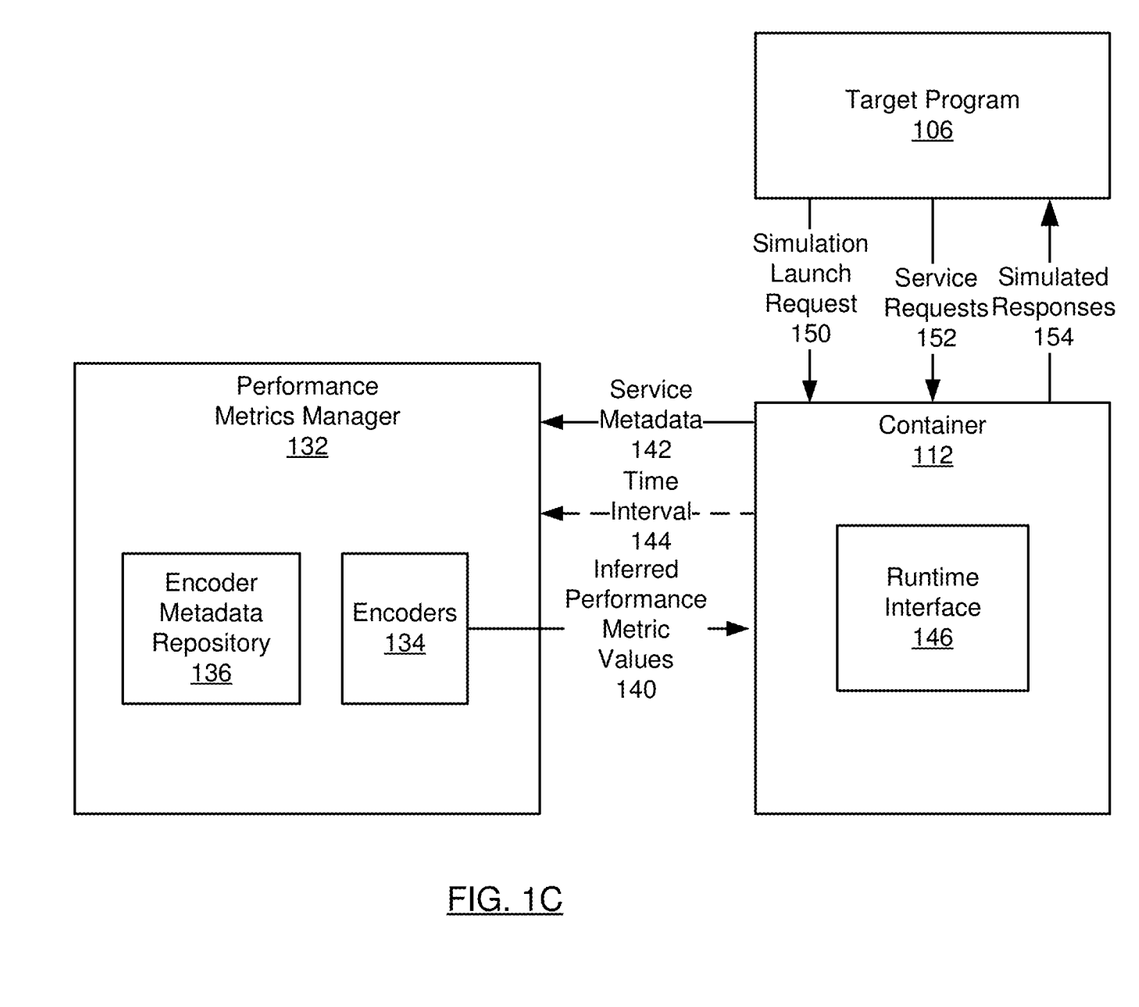

Turning to FIG. 1C, the encoders (134) includes functionality to generate inferred performance metric values (140) corresponding to performance metrics of services (108A, 108K). An inferred performance metric value (140) is a value of the performance metric that is inferred by an encoder. Thus, the inferred performance metric value (140) is a value resulting from encoding the raw performance metric value. The inferred performance metric value (140) thereby mimics the raw performance metric value when anomalies (e.g., abnormalities) are removed. An inferred performance metric value (140) may be a time series of values of a latent variable learned from a time series of values of a performance metric in training data. For example, the latent variable may be based on a statistical measure (e.g., a z-score). Further description of the latent variable is presented below in reference to Step 204 of FIG. 2 below.

Figure 1D:
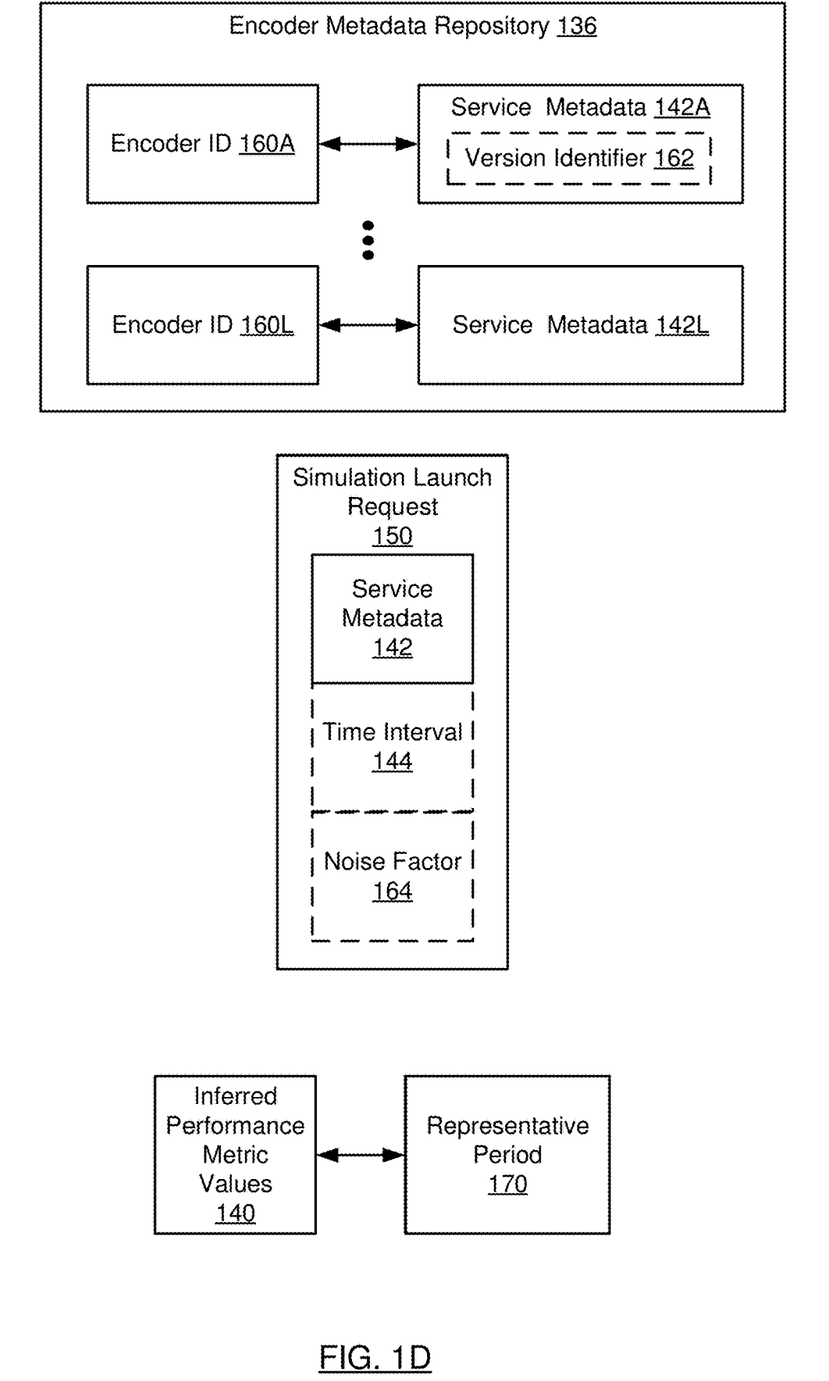

Turning to FIG. 1D, the encoder metadata repository (136) includes encoder identifiers (IDs) (160A, 160L) corresponding to service metadata (142A, 142L). The encoder ID (160A) is a unique identifier of an encoder. The service metadata (142A) includes attributes of the service whose performance metric(s) are encoded by an encoder identified by the corresponding encoder ID (160A). Examples of such attributes include a service name or other identifier of the service, a portal through which the service may be accessed, an owner of the service, etc. Optionally, the service metadata (142A) may include a version identifier (162) of the encoder identified by the corresponding encoder ID (160A). The version identifier (162) may correspond to a specific time interval. For example, the specific time interval may be a time interval corresponding to a specific event, such as a product launch or a time interval when the service experienced a heavy load (e.g., peak tax season) or a failure. Continuing this example, when the service metadata (142A) includes a version identifier (162) that corresponds to a specific time interval, the encoder may be restricted to generate inferred performance metric values (140) for the specific time interval.

Returning to FIG. 1C, in one or more embodiments, the container (112) is a runtime instance of an image. An image (e.g., a Docker image) may include executable code and an execution environment. In one or more embodiments, the executable code may be a collection of object code (e.g., generated by a compiler). For example, the executable code may be dynamically linked code or an archive file that packages compiled components. In one or more embodiments, the execution environment includes software components needed to execute the executable code. For example, the execution environment may include libraries, frameworks, configuration files, and any other software components or technologies upon which the executable code depends (e.g., no additional installation, customization, or resources are required to execute the executable code).

The container (112) includes functionality to receive a simulation launch request (150) from the target program (106). Returning to FIG. 1D, the simulation launch request (150) includes service metadata (142). The simulation launch request (150) is a request to launch a simulation of a service described by the service metadata (142). The container (112) includes functionality to send the service metadata (142) to the performance metrics manager (132). The container (112) includes functionality to receive, from the performance metrics manager (132), inferred performance metric values (140) generated by an encoder (134) whose service metadata matches the service metadata sent by the container (112). See description of Step 206 below.

The inferred performance metric values (140) may correspond to a representative period (170) within a time interval. The simulation launch request (150) optionally includes a time interval (144). The container (112) includes functionality to send the time interval (144) to the performance metrics manager (132). For example, the inferred performance metric values (140) received by the container (112) from the performance metrics manager (132) may correspond to a representative period (170) within the time interval (144) sent to the performance metrics manager (132).

The simulation launch request (150) optionally includes a noise factor (164). The container (112) includes functionality to modify inferred performance metric values (140) using the noise factor (164). For example, the noise factor (164) may be a factor by which to scale (e.g., multiply) the inferred performance metric values (140).

The container (112) includes functionality to receive service requests (152) from the target program (106). The container (112) includes functionality to send simulated responses (154) to the target program (106) in response to the received service requests (152) according to the received inferred performance metric values (140). For example, the container (112) may generate the simulated responses (154) according to the received inferred performance metric values (140) corresponding to a latency performance metric or an error rate performance metric.

The container (112) may include a runtime interface (146) that includes functionality to receive the service requests (152) and send the simulated responses (154). The runtime interface (146) may provide the same functionality as the API of the service simulated by the container (112). The container (112) may include functionality to generate performance metrics that measure aspects of the operation of the container (112).

While FIG. 1A, FIG. 1B, FIG. 1C, and FIG. 1D show configurations of components, other configurations may be used without departing from the scope of the invention. For example, various components may be combined to create a single component. As another example, the functionality performed by a single component may be performed by two or more components.

Figure 2:
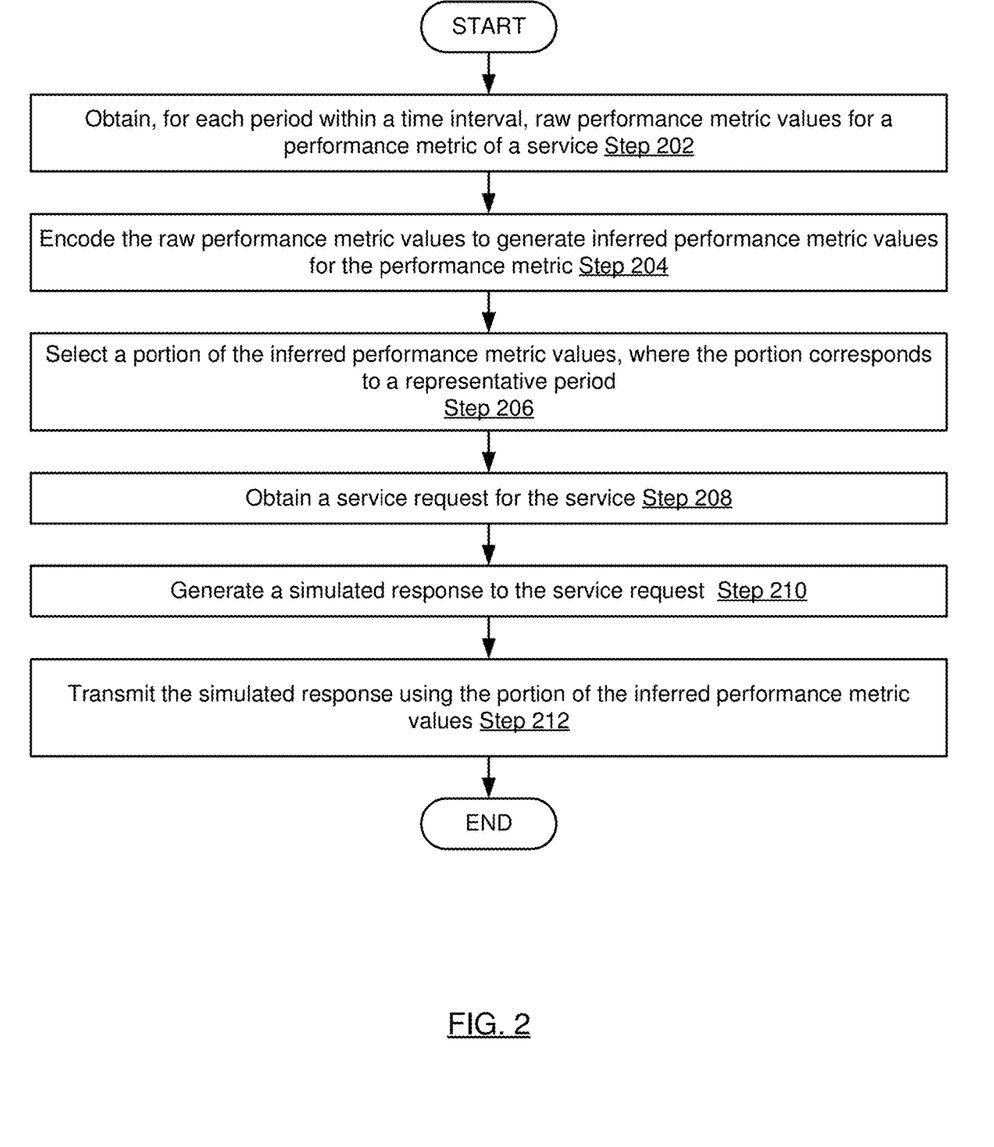
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for simulating the performance of a service. One or more of the steps in FIG. 2 may be performed by the components (e.g., the performance metrics manager (132), container (112), and target program (106)), discussed above in reference to FIG. 1B and FIG. 1C. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, raw performance metric values for a performance metric of a service are obtained for each period within a time interval. The time interval may be obtained from a configuration file (e.g., stored in a repository). Alternatively, a default time interval may be used. For example, the default time interval may be "the most recent two weeks." The raw performance metric values for the performance metric may be obtained from a repository.

In Step 204, the raw performance metric values are encoded to generate inferred performance metric values for the performance metric. An encoder may generate the inferred performance metric values. The encoder may be a long short-term model (LSTM) autoencoder that reconstructs its input sequence. The autoencoder may generate the inferred performance metric values using training losses calculated when reconstructing the raw performance metric values. The autoencoder may be trained using baseline raw performance metric values for the performance metric for a baseline period. That is, the autoencoder may learn a representation (e.g., an encoding) of the baseline raw performance metric values.

The periods within the time interval are filtered using the inferred performance metric values for the performance metric to obtain a representative subset of the periods. The autoencoder may filter the periods by clustering the periods into a representative subset and an anomalous subset. The autoencoder uses z-scores calculates for the training losses to determine whether each of the raw performance metric values represents an anomaly (e.g., outlier). The clustering may be based on a number of anomalous z-scores in the z-scores for the respective period exceeding a threshold z-score. For example, the anomalous subset may include periods that include a number of anomalous z-scores exceeding a threshold number of z-scores and the representative subset may include periods that include a number of anomalous z-scores below the threshold number of z-scores. Continuing this example, the anomalous subset may include periods when a power outage occurred resulting in elevated values for the performance metric that are atypical with respect to the baseline period. As another example, the anomalous subset may include weekend days corresponding to reduced raw performance metric values for the performance metric that are atypical with respect to the baseline period. The clustering may be performed using k-nearest neighbor clustering.

The baseline period may be selected (e.g., by a user) as a representative period regarding the performance metric of the service. Alternatively, the baseline raw performance metric values for the performance metric may be obtained from a configuration file (e.g., stored in a repository). The autoencoder corresponds to service metadata.

In Step 206, a portion of the inferred performance metric values is selected. The portion of the inferred performance metric values corresponds to a representative period. The autoencoder may select the representative period from the representative subset. For example, the autoencoder may select the representative period at random from the representative subset. As another example, the autoencoder may select, as the representative period, a period in the representative subset with the fewest number of anomalous z-scores exceeding the threshold z-score.

The portion of the inferred performance metric values may be received by a container. The back-end computer system may obtain the container from a container repository.

The container may receive a simulation launch request including service metadata. The simulation launch request may be sent by the target program. The simulation launch request may specify the time interval. In response to receiving the simulation launch request, the container may obtain the portion of the inferred performance metric values from an autoencoder whose service metadata matches the service metadata included in the simulation launch request. The container may determine, by querying a repository, that the service metadata of the autoencoder referenced in Step 204 above matches the service metadata included in the simulation launch request. The repository may include service metadata corresponding to multiple autoencoders. For example, the service metadata of the autoencoder may match the service metadata included in the simulation launch request when both the service metadata of the autoencoder and the service metadata included in the simulation launch request include the same service name and/or other identifier of the service.

If the simulation launch request includes a noise factor, the container may scale the inferred performance metric values by the noise factor.

In Step 208, a service request for the service is obtained. The service request may be sent by the target program to the container, for example, to test the behavior of the target program using the simulated performance of the service by the container.

In Step 210, a simulated response is generated in response to the first service request. The container may generate the simulated response.

In Step 212, the simulated response is transmitted using the portion of the inferred performance metric values. The container may transmit, to the target program, the simulated response according to the portion of the inferred performance metric values (e.g., if the performance metric is latency, error rate, throughput, etc.). The performance of the container while transmitting the simulated response may replay the performance of the representative period, as manifested in the portion of the inferred performance metric values. Alternatively, the container may transmit the inferred performance metric value directly (e.g., if the performance metric is resource utilization metric).

The steps of FIG. 2 may be repeated for a pipeline of successive time intervals. For example, Step 202 may be repeated to obtain next raw performance metric values for the performance metric for periods within a next time interval. Continuing this example, Step 204 may be repeated to encode the next raw performance metric values to generate next inferred performance metric values for the performance metric. The autoencoder may be further trained using next baseline raw performance metric values for the performance metric for a next baseline period. The autoencoder may set the next baseline period to the representative period. Similarly, Step 206, Step 208, Step 210, and Step 212 may also be repeated.

Although FIG. 2 is described for a single performance metric, the operations of FIG. 2 may be performed for multiple various performance metrics. In such a scenario, the simulated response is transmitted in compliance with the multiple inferred performance metric values for the various performance metrics.

Further, although FIG. 2 presents a single service request and simulated response, Steps 208-212 may be performed for multiple service requests. For example, the operations of FIG. 2 may be used for benchmarking the target program.

Figure 3A:
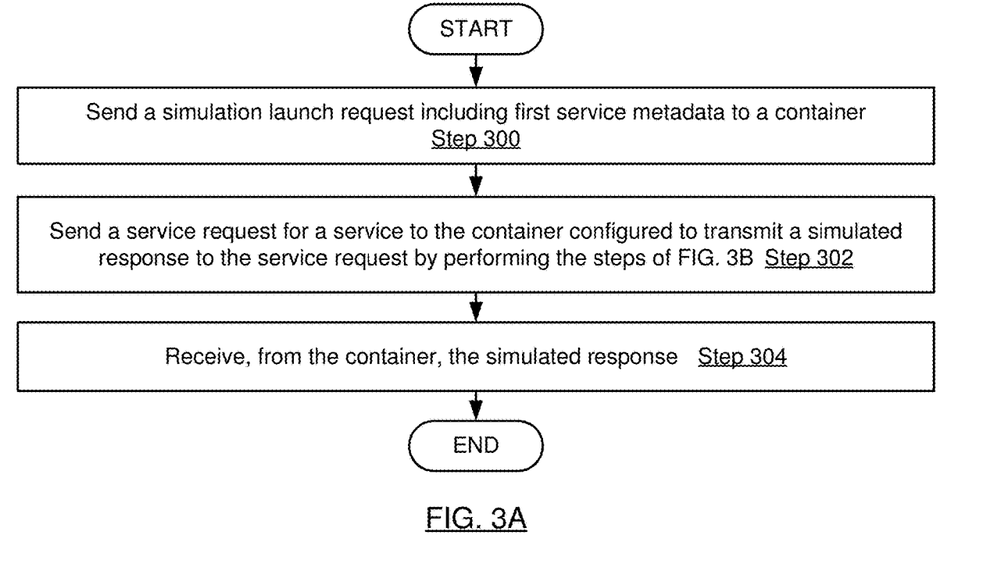

FIG. 3A shows a flowchart in accordance with one or more embodiments of the invention. The flowchart depicts a process for simulating the performance of a service. One or more of the steps in FIG. 3A may be performed by the components (e.g., the performance metrics manager (132), container (112), and target program (106)), discussed above in reference to FIG. 1B and FIG. 1C. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, a simulation launch request including first service metadata is sent to a container (see description of Step 206 above). A target program may send the simulation launch request to the container via a network.

Figure 3B:
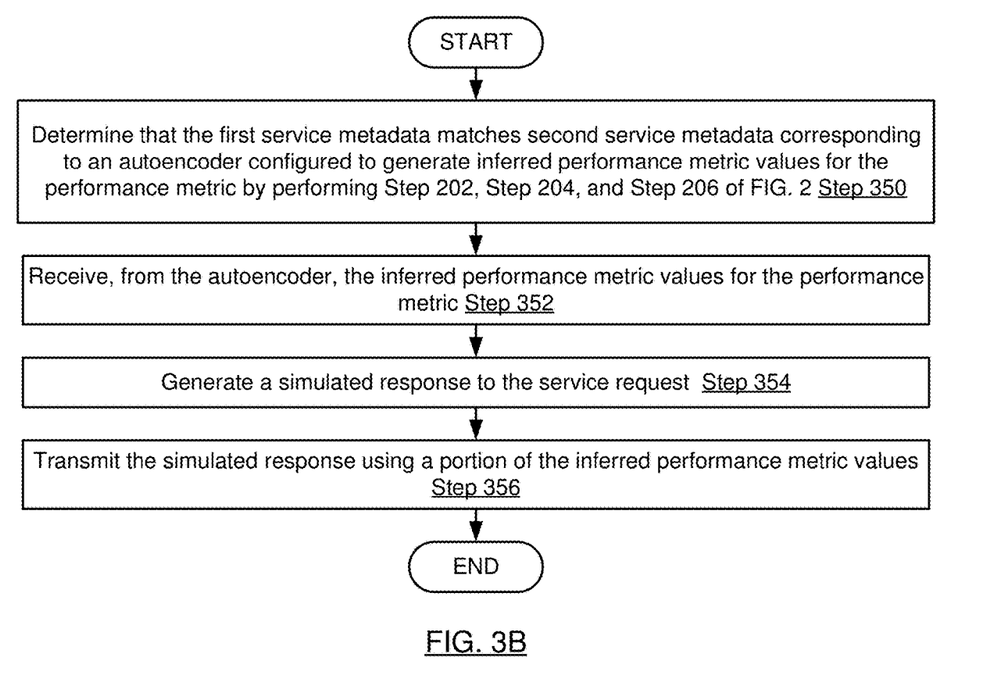

In Step 302, a service request for a service is sent to the container configured to transmit a simulated response by performing the steps of FIG. 3B. The target program may send the service request to the container via the network.

In Step 304, the simulated response is received from the container. The target program may receive the simulated response from the container via the network.

FIG. 3B shows a flowchart in accordance with one or more embodiments of the invention. The flowchart depicts a process for simulating the performance of a service. One or more of the steps in FIG. 3B may be performed by the components (e.g., the performance metrics manager (132), container (112), and target program (106)), discussed above in reference to FIG. 1B and FIG. 1C. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 350, it is determined that the first service metadata matches second service metadata corresponding to an encoder configured to generate inferred performance metric values for the performance metric by performing the Step 202, Step 204, and Step 206 of FIG. 2.

In Step 352, the inferred performance metric values for the performance metric are received from the encoder (see description of Step 204 above).

In Step 354, the simulated response is generated (see description of Step 210 above).

In Step 356, the simulated response is transmitted using a portion of the inferred performance metric values (see description of Step 212 above).

Figure 4A:
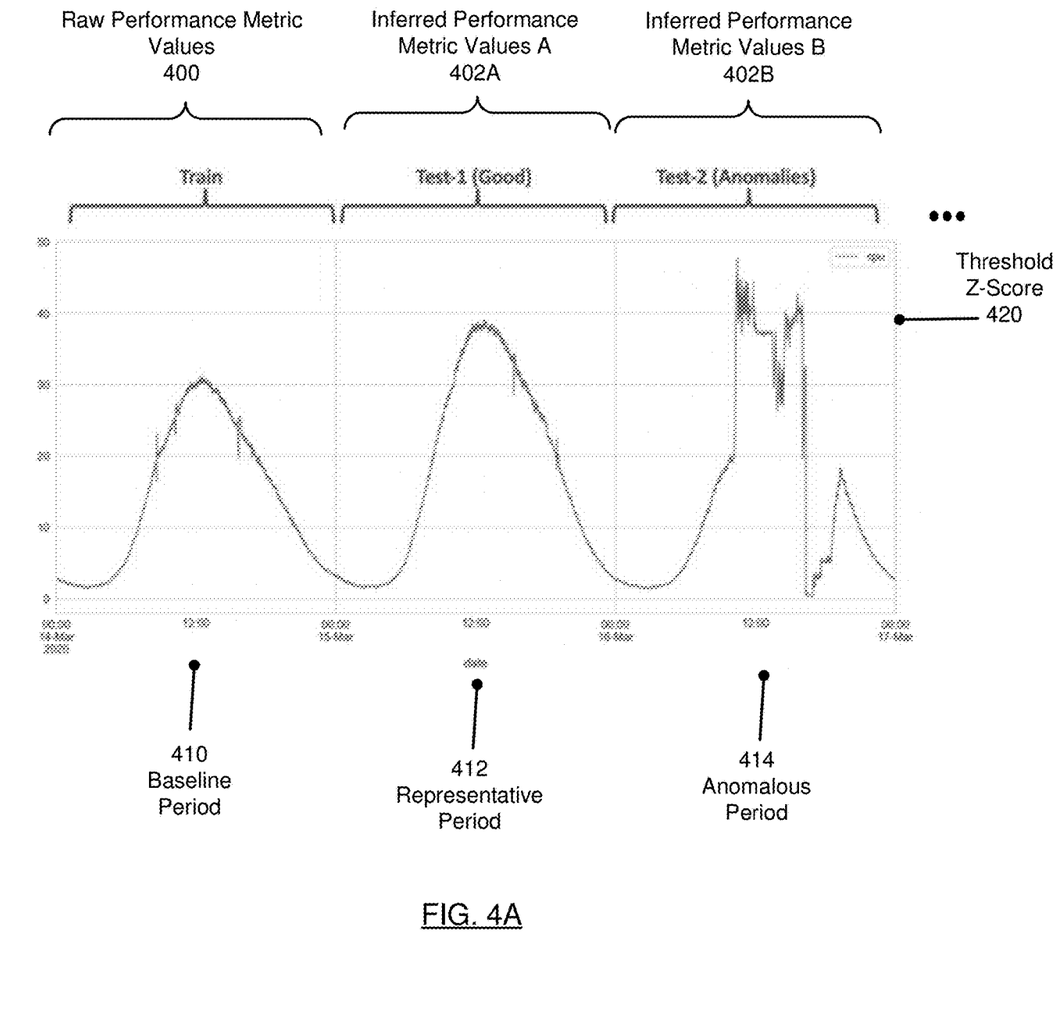
FIG. 4A and FIG. 4B show examples in accordance with one or more embodiments of the invention.
Figure 4B:
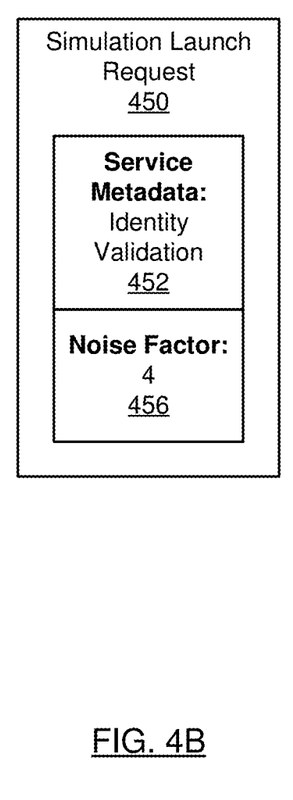

The following example is for explanatory purposes only and not intended to limit the scope of the invention. FIG. 4A and FIG. 4B show an implementation example in accordance with one or more embodiments of the invention. FIG. 4A shows raw performance metric values (400) ((126A, 126J) in FIG. 1B) of an identity validation service for a baseline period (410) ((124A, 124J) in FIG. 1B). The performance metric is network latency.

An autoencoder is trained using the performance metric values (400) of the baseline period (410). The autoencoder generates inferred performance metric values (e.g., 402A, 402B) ((140) in FIG. 1C and FIG. 1D) for each period (i.e., each day) in a default time interval of 2 weeks using training losses calculated for the raw performance metric values for each period. The autoencoder clusters the periods into a representative subset of periods and an anomalous subset of periods based on calculating a number of anomalous z-scores for the inferred performance metric values of each period exceeding a threshold z-score (420) of 2. The autoencoder selects one of the periods in the representative subset as the representative period (412) ((170) in FIG. 1D). FIG. 4A also shows an anomalous period (414) in the anomalous subset that includes several inferred values for the performance metric exceeding the threshold z-score (420).

FIG. 4B shows a simulation launch request (450) ((150) in FIG. 1C and FIG. 1D) received by a container in a simulation environment from a target program that is currently under development. The simulation launch request (450) includes service metadata (452) ((142) in FIG. 1C and (142, 142A, 142L) in FIG. 1D) and a noise factor (456) ((164) in FIG. 1D). In response to receiving the simulation launch request (450), the container sends the service metadata (452) to a performance metrics manager which queries a repository to identify the encoder whose service metadata matches the service metadata (452). The container receives, from the encoder, inferred performance metric values (402A) for the representative period (412). The container multiplies the inferred performance metric values (402A) for the representative period (412) by the noise factor (456).

The container next receives, from the target program, a series of service requests. In response to receiving the series of service requests, the container generates, and then transmits a series of simulated responses in accordance with the inferred performance metric values (402A) for the representative period (412). That is, the operation of the container while generating the series of simulated responses conforms to the inferred performance metric values (402A) for the representative period (412). Thus, the simulation environment is able to simulate the performance of the service for the target program without the overhead of providing a full target production environment for the target program.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIG. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
executing a target program, wherein executing the target program comprises:
sending, by the target program, a simulation launch request to execute a service of a plurality of services, the simulation launch request comprising first service metadata,
obtaining, for each period of a first plurality of periods within a first time interval, a first plurality of raw performance metric values for a performance metric of the service,
encoding, by an autoencoder of a plurality of autoencoders, the first plurality of raw performance metric values to generate a first plurality of inferred performance metric values for the performance metric, wherein the plurality of autoencoders are each related to corresponding service metadata,
determine, responsive to the simulation launch request, the autoencoder from the plurality of autoencoders based on the first service metadata matching second service metadata of the autoencoder,
selecting a first portion of the first plurality of inferred performance metric values, the first portion corresponding to a first representative period in the first plurality of periods,
obtaining a first service request for the service,
generating a first simulated response to the first service request, and
transmitting the first simulated response according to the first portion of the first plurality of inferred performance metric values.

2. The method of claim 1, further comprising:
filtering, using the first plurality of inferred performance metric values for the performance metric, the first plurality of periods to obtain a first representative subset of the first plurality of periods, the first representative subset comprising the first representative period.

3. The method of claim 2, wherein filtering the first plurality of periods comprises:
calculating a plurality of training losses for the first plurality of raw performance metric values;
for at least a subset of the first plurality of periods, calculating a number of z-scores, for the plurality of training losses, that exceed a threshold z-score; and
clustering, using the number of z-scores, the first plurality of periods into the first representative subset and an anomalous subset.

4. The method of claim 1, wherein the simulation launch request further comprises a noise factor, the method further comprising:
modifying, using the noise factor, the first plurality of inferred performance metric values for the first representative period.

5. The method of claim 1, further comprising:
training the autoencoder using a first baseline plurality of raw performance metric values for the performance metric of the service, the first baseline plurality of raw performance metric values corresponding to a first baseline period.

6. The method of claim 5, further comprising:
training the autoencoder using a second baseline plurality of raw performance metric values for the performance metric of the service, the second baseline plurality of raw performance metric values corresponding to a second baseline period set to the first representative period;
obtaining, for each of a second plurality of periods within a second time interval, a second plurality of raw performance metric values for the performance metric of the service;
encoding the second plurality of raw performance metric values to generate a second plurality of inferred performance metric values for the performance metric;
selecting a second portion of the second plurality of inferred performance metric values, the second portion corresponding to a second representative period in the second plurality of periods;
obtaining a second service request for the service;
generating a second simulated response to the second service request; and
transmitting the second simulated response using the second portion of the second plurality of inferred performance metric values.

7. A system comprising:
a computer processor for executing a target program, wherein executing the target program comprises generating, by the target program, a simulation launch request to execute a service of a plurality of services, the simulation launch request comprising first service metadata;
an autoencoder of a plurality of autoencoders configured to:
obtain, for each period of a first plurality of periods within a first time interval, a first plurality of raw performance metric values for a performance metric of the service,
encode the first plurality of raw performance metric values to generate a first plurality of inferred performance metric values for the performance metric, and
select a first portion of the first plurality of inferred performance metric values, the first portion corresponding to a first representative period in the first plurality of periods,
wherein the plurality of autoencoders each related to corresponding service metadata; and
a container configured to:
determine, responsive to the simulation launch request, the autoencoder from the plurality of autoencoders based on the first service metadata matching second service metadata of the autoencoder,
obtain a first service request for the service,
generate a first simulated response to the first service request, and
transmit the first simulated response according to the first portion of the first plurality of inferred performance metric values.

8. The system of claim 7, wherein the autoencoder is further configured to:
filter, using the first plurality of inferred performance metric values for the performance metric, the first plurality of periods to obtain a first representative subset of the first plurality of periods, the first representative subset comprising the first representative period.

9. The system of claim 8, wherein filtering the first plurality of periods comprises:
calculating a plurality of training losses for the first plurality of raw performance metric values;
for at least a subset of the first plurality of periods, calculating a number of z-scores, for the plurality of training losses, that exceed a threshold z-score; and
clustering, using the number of z-scores, the first plurality of periods into the first representative subset and an anomalous subset.

10. The system of claim 7, wherein the simulation launch request further comprises a noise factor, and wherein the container is further configured to:
modify, using the noise factor, the first plurality of inferred performance metric values for the first representative period.

11. The system of claim 7, wherein the autoencoder is trained using a first baseline plurality of raw performance metric values for the performance metric of the service, the first baseline plurality of raw performance metric values corresponding to a first baseline period.

12. The system of claim 11,
wherein the autoencoder is further trained using a second baseline plurality of raw performance metric values for the performance metric of the service, the second baseline plurality of raw performance metric values corresponding to a second baseline period set to the first representative period, and wherein the autoencoder is further configured to:
obtain, for each of a second plurality of periods within a second time interval, a second plurality of raw performance metric values for the performance metric of the service,
encode the second plurality of raw performance metric values to generate a second plurality of inferred performance metric values for the performance metric, and
select a second portion of the second plurality of inferred performance metric values, the second portion corresponding to a second representative period in the second plurality of periods, and
wherein the container is further configured to:
obtain a second service request for the service,
generate a second simulated response to the second service request, and
transmit the second simulated response using the second portion of the second plurality of inferred performance metric values.

13. A method comprising:
executing a target program, wherein executing the target program comprises:
sending a simulation launch request comprising first service metadata to a container,
sending a first service request for a service to the container, wherein the container is configured to perform:
determining that the first service metadata matches second service metadata corresponding to an autoencoder of a plurality of autoencoders, wherein the plurality of autoencoders are each related to corresponding service metadata,
receiving, from the autoencoder, a first plurality of inferred performance metric values for the performance metric for a first representative period of a first plurality of periods,
generating a first simulated response to the first service request, and
transmitting the first simulated response according to a first portion of the first plurality of inferred performance metric values, the first portion corresponding to the first representative period,
wherein the autoencoder is configured to perform:
obtaining, for each period of the first plurality of periods within a first time interval, a first plurality of raw performance metric values for the performance metric of the service,
encoding the first plurality of raw performance metric values to generate the first plurality of inferred performance metric values, and
selecting the first portion of the first plurality of inferred performance metric values, and
receiving, from the container, the first simulated response.

14. The method of claim 13, wherein the autoencoder is further configured to perform:
filtering, using the first plurality of inferred performance metric values for the performance metric, the first plurality of periods to obtain a first representative subset of the first plurality of periods, the first representative subset comprising the first representative period.

15. The method of claim 14, wherein filtering the first plurality of periods comprises:
calculating a plurality of training losses for the first plurality of raw performance metric values;
for at least a subset of the first plurality of periods, calculating a number of z-scores, for the plurality of training losses, that exceed a threshold z-score; and
clustering, using the number of z-scores, the first plurality of periods into the first representative subset and an anomalous subset.

16. The method of claim 13, wherein the simulation launch request further comprises a noise factor, and wherein the container is further configured to perform:
modifying, using the noise factor, the first plurality of inferred performance metric values for the first representative period.

17. The method of claim 13, wherein the autoencoder is trained using a first baseline plurality of raw performance metric values for the performance metric of the service, the first baseline plurality of raw performance metric values corresponding to a first baseline period.

18. The method of claim 17,
wherein the autoencoder is further trained using a second baseline plurality of raw performance metric values for the performance metric of the service, the second baseline plurality of raw performance metric values corresponding to a second baseline period set to the first representative period, and wherein the autoencoder is further configured to perform:
obtaining, for each of a second plurality of periods within a second time interval, a second plurality of raw performance metric values for the performance metric of the service,
encoding the second plurality of raw performance metric values to generate a second plurality of inferred performance metric values for the performance metric, and
selecting a second portion of the second plurality of inferred performance metric values, the second portion corresponding to a second representative period in the second plurality of periods, wherein the container is further configured to perform:
obtaining a second service request for the service,
generating a second simulated response to the second service request, and
transmitting the second simulated response using the second portion of the second plurality of inferred performance metric values.

\* \* \* \* \*